(12) United States Patent
Sugiura et al.

(10) Patent No.: US 10,597,927 B2
(45) Date of Patent: Mar. 24, 2020

(54) BACKDOOR OPENING AND CLOSING APPARATUS

(71) Applicant: AISIN SEIKI KABUSHIKI KAISHA, Kariya-shi (JP)

(72) Inventors: Takehiko Sugiura, Kariya (JP); Yuki Sakato, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 16/001,976

(22) Filed: Jun. 7, 2018

(65) Prior Publication Data

US 2018/0371823 A1  Dec. 27, 2018

(30) Foreign Application Priority Data

Jun. 23, 2017 (JP) ................................ 2017-123383

(51) Int. Cl.
| | | |
|---|---|---|
| *E05F 15/73* | (2015.01) | |
| *B60Q 1/26* | (2006.01) | |
| *B60Q 1/00* | (2006.01) | |
| *B60Q 1/50* | (2006.01) | |

(52) U.S. Cl.
CPC ............ *E05F 15/73* (2015.01); *B60Q 1/0023* (2013.01); *B60Q 1/2607* (2013.01); *B60Q 1/2661* (2013.01); *B60Q 1/2696* (2013.01); *B60Q 1/50* (2013.01); *B60Q 2400/40* (2013.01); *E05Y 2400/852* (2013.01); *E05Y 2900/546* (2013.01)

(58) Field of Classification Search
None
See application file for complete search history.

(56) References Cited

U.S. PATENT DOCUMENTS

| | | | | |
|---|---|---|---|---|
| 2015/0226870 A1* | 8/2015 | Sieg | ........................ | E05F 15/74 |
| | | | | 324/658 |
| 2015/0262436 A1* | 9/2015 | Herthan | .............. | B60R 25/2054 |
| | | | | 340/5.72 |
| 2015/0291126 A1* | 10/2015 | Nicholls | ............. | B60R 25/2054 |
| | | | | 701/49 |
| 2015/0300074 A1* | 10/2015 | Ette | ....................... | B60R 25/245 |
| | | | | 701/2 |
| 2016/0139579 A1 | 5/2016 | Hirota et al. | | |

FOREIGN PATENT DOCUMENTS

| | | |
|---|---|---|
| JP | 2005-307692 | 11/2005 |
| JP | 2011-252881 | 12/2011 |
| JP | 2016-98496 | 5/2016 |

* cited by examiner

*Primary Examiner* — Tamara L Weber
(74) *Attorney, Agent, or Firm* — Oblon, McClelland, Maier & Neustadt, L.L.P.

(57) ABSTRACT

A backdoor opening and closing apparatus includes an operation input detection portion detecting an operation input for operating a backdoor in response to a detection signal sent from a sensor configured to include a detection area at a lateral rear portion of a vehicle, an operation control portion operating the backdoor in response to the operation input, a passenger determination portion determining whether an authorized passenger is positioned within a common area where a lateral portion determination area and a rear portion determination area overlap with each other, and an allowance determination portion allowing a predetermined operation of the backdoor in response to the operation input in a case where the passenger determination portion determines that the authorized passenger is positioned within the common area ($\alpha x$).

7 Claims, 4 Drawing Sheets

BACKDOOR OPENING AND CLOSING APPARATUS

CROSS REFERENCE TO RELATED APPLICATIONS

This application is based on and claims priority under 35 U.S.C. § 119 to Japanese Patent Application 2017-123383, filed on Jun. 23, 2017, the entire content of which is incorporated herein by reference.

TECHNICAL FIELD

This disclosure generally relates to a backdoor opening and closing apparatus.

BACKGROUND DISCUSSION

A known backdoor opening and closing apparatus for a vehicle is disclosed in JP2016-98496A (hereinafter referred to as Patent reference 1). According to Patent reference 1, the backdoor opening and closing apparatus for the vehicle may detect an operation input of a passenger for operating a backdoor in a contactless manner. Patent reference 1 discloses the backdoor opening and closing apparatus for the vehicle including an emblem which is mounted on the backdoor and which is embedded with a capacitance sensor for detecting the operation input. The passenger may easily recognize a position of the sensor recognizing the emblem as a guide, and the backdoor may operate by the operation input of, for example, an approach of a hand of the passenger to the emblem.

Meanwhile, according to the aforementioned configuration, the emblem being embedded with the capacitance sensor is arranged at a substantially center of the backdoor. Accordingly, when approaching his/her hand to the emblem, the passenger tends to stand on a substantially front of the backdoor so that a movement trace of the backdoor in accordance with the opening and closing thereof and the passenger may easily interfere with each other. As a result, there is an issue of the degradation of the operability of the opening and closing apparatus.

Such issue is not limited for an apparatus detecting an operation input in a contactless manner, and for example, the issue may similarly occur in an apparatus detecting the operation input in accordance with the contact of, for example, a touch sensor.

A need thus exists for a backdoor opening and closing apparatus which is not susceptible to the drawback mentioned above.

SUMMARY

According to an aspect of this disclosure, a backdoor opening and closing apparatus includes an operation input detection portion detecting an operation input for operating a backdoor in response to a detection signal sent from a sensor configured to include a detection area at a lateral rear portion of a vehicle, an operation control portion operating the backdoor in response to the operation input, a passenger determination portion determining whether an authorized passenger who has an operation authority is positioned within a common area where a lateral portion determination area and a rear portion determination area overlap with each other, the lateral portion determination area which is set in a vicinity of the lateral rear portion of the vehicle, the rear portion determination area which is set in a vicinity of a rear of the vehicle, and an allowance determination portion allowing a predetermined operation of the backdoor in response to the operation input in a case where the passenger determination portion determines that the authorized passenger is positioned within the common area.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
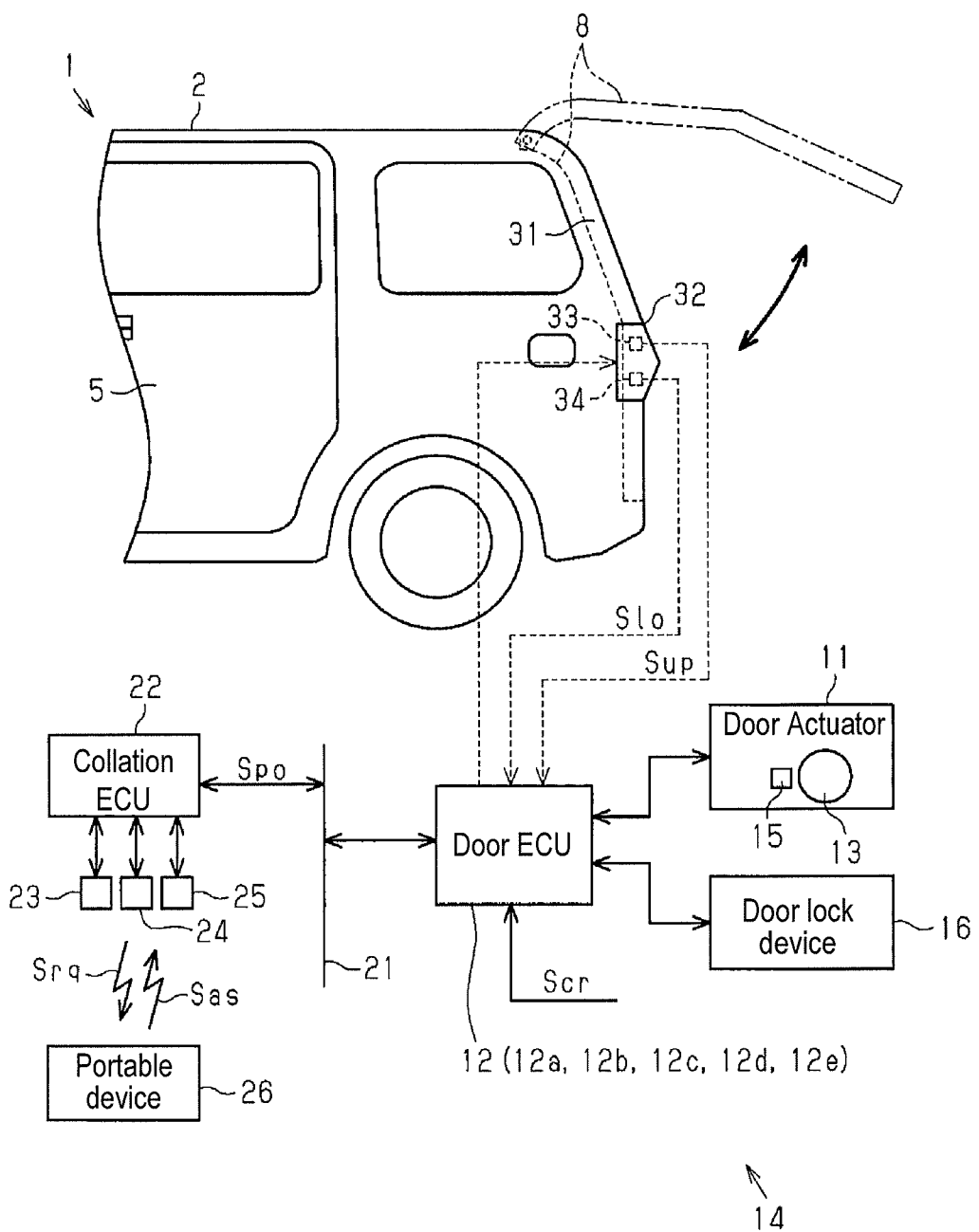
FIG. 1 is a schematic view illustrating a configuration of a backdoor opening and closing apparatus according to an embodiment disclosed here.
Figure 2:
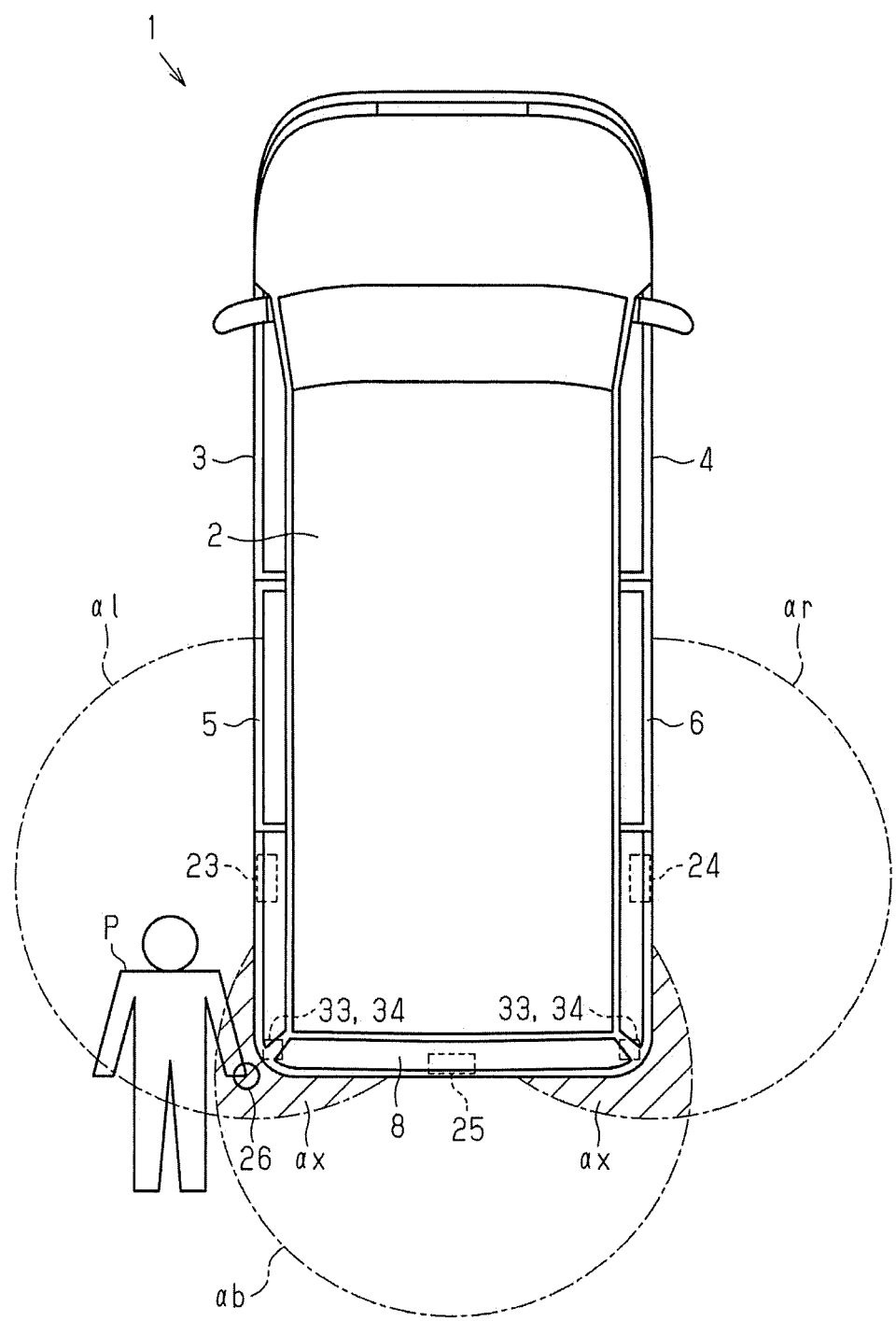
FIG. 2 is a plan view of a vehicle.
Figure 3:
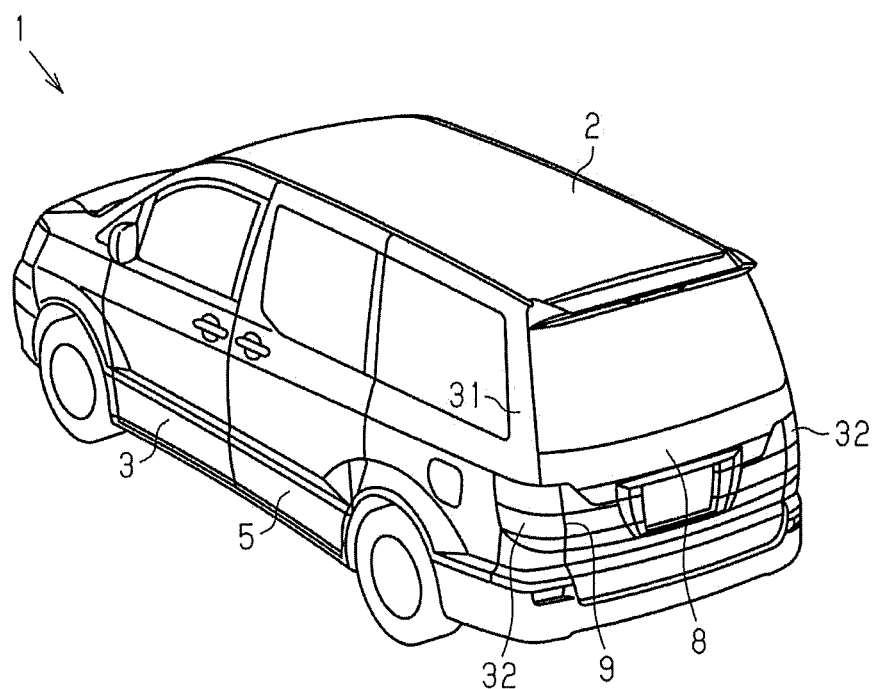
FIG. 3 is a perspective view of the vehicle.

Hereinafter, an embodiment of a backdoor opening and closing apparatus will be explained with reference to the drawings. As illustrated in FIGS. 1 to 3, a vehicle 1 includes four side doors 3, 4, 5, 6 provided at the right and left side surfaces of a vehicle body 2, and a backdoor 8 provided at a rear end portion of the vehicle body 2. The backdoor 8 opens and closes a door opening portion 9 provided at a rear of the vehicle body 2 and opening the backdoor 8. The backdoor 8 of the embodiment corresponds to a so-called flap door opening and closing the door opening portion 9 by rotating about an upper end part as a fulcrum point. Each of the two side doors 3, 4 arranged at a right front portion and a left front portion of the vehicle 1 corresponds to a swing door rotating about a front end part as a fulcrum point. Each of the two side doors 5, 6 provided at lateral rear portions of the vehicle 1 corresponds to a sliding door moving in a vehicle front-rear direction.

As illustrated in FIG. 1, the vehicle 1 includes a door actuator 11 driving to open and close the backdoor 8, and a door ECU (Electronic Control System) 12 controlling the operation of the door actuator 11. The door actuator 11 drives the backdoor 8 to open and close by including a motor 13 as a drive source. The door ECU 12 controls the operation of the backdoor 8 by driving the door actuator 11 via a power supply to the motor 13. Accordingly, the vehicle 1 is configured with a backdoor opening and closing apparatus 14 controlling the operation of the backdoor 8 in response to the drive force of the motor 13.

Meanwhile, the door ECU 12 controls the operation of the backdoor 8 in a state where the door lock apparatus 16 releases the restriction of the backdoor 8. The door actuator 11 includes a pulse sensor 15 outputting two pulse signals including different phases to the door ECU 12 in response to the rotation of the motor 13. The door ECU 12 detects the opening and closing position of the backdoor 8 by measuring the number of pulse of the pulse signal based on a predetermined position of the backdoor 8 (for example, a fully-closed position).

The door ECU 12 is inputted with an operation input signal Scr indicating an opening and closing operation requirement of the backdoor 8. The operation input signal Scr is generated by the operation of an operation switch provided, for example, inside a compartment or at the side door 4 of the vehicle 1 operated by the passenger. The door ECU 12 controls the operation of the backdoor 8 in response to the operation requirement of the passenger indicated by the operation input signal Scr. The door ECU 12 of the embodiment controls the operation of the backdoor 8 by detecting the operation input for operating the backdoor 8 in the contactless manner by an authorized passenger positioned at a common area ax.

Next, the determination of whether an authorized passenger P is positioned at the common area ax will be explained. The door ECU 12 acquires information relating to the authorized passenger P who has an operation right of the vehicle 1 by communicating with a collation ECU 22 serving as a collation control device via an in-vehicle network 21. The collation ECU 22 of the embodiment determines whether a portable device 26 corresponds to an authorized portable device 26 which supports the vehicle 1 by communicating with the portable device 26 in a wireless manner via communication devices 23, 24, 25 that each corresponds to, for example, an antenna. A person who has the authorized portable device 26 is recognized as the authorized passenger P having the operation right of the vehicle 1.

Specifically, as illustrated in FIG. 2, the communication device 23 is arranged in the vicinity of the side door 5 at the left of the lateral rear portion of the vehicle body 2, the communication device 24 is arranged in the vicinity of the side door 6 at the right of the lateral rear portion of the vehicle body 2, and the communication device 25 is arranged at the rear end portion of the vehicle body 2. The communication devices 23, 24, 25 send a required radio signal Srq to surroundings in a preset order in response to control signals sent from the collation ECU 22.

Specifically, the required radio signal Srq is sent to the surroundings of the left of the lateral rear portion of the vehicle 1 by the communication device 23 provided at the left of the lateral rear portion, and the required radio signal Srq is sent to the surroundings of the right of the lateral rear portion of the vehicle 1 by the communication device 24 provided at the right of the lateral rear portion. Then, a range which the required radio signals Srq sent by the communication devices 23, 24 provided at the right and left of the lateral rear portions reach corresponds to lateral portion determination areas $\alpha l$, $\alpha r$. The communication device 25 provided at the rear end portion sends the required radio signal Srq to the surrounding of the rear portion of the vehicle 1, and a range which the required radio signal Srq sent by the communication device 25 reaches corresponds to a rear portion determination area $\alpha b$. The positions of the communication devices 23, 24, 25 and a coverage of the required range signal Srq are set such that the lateral portion determination areas al, ar and the rear portion determination area $\alpha b$ are overlapped with one another at obliquely rear lateral portions of the vehicle 1. The overlapped areas of the lateral portion determination areas $\alpha l$, ar and the rear portion determination area $\alpha b$ correspond to common areas ax. For convenience of description, in FIG. 2, the common areas ax are applied with a hatching pattern.

As illustrated in FIG. 1, the portable device 26 sends a response radio signal Sas in response to the required radio signal Srq which the portable device 26 receives, and operates radio communication with the collation ECU 22. In the radio communication, the portable device 26 sends, for example, an ID code previously registered in the portable device 26. The collation ECU 22 collates whether, for example, the ID code sent from the portable device 26 coincides with, for example, the ID code previously registered in the collation ECU 22. In a case where the collation is established, the portable device 26 is determined to be the authorized portable device 26. To send the required radio signal Srq from the communication devices 23, 24, 25 in the preset order, the collation ECU 22 determines whether the portable device 26 is positioned, that is, whether the authorized passenger P who carries the portable device 26 is positioned within any of the lateral portion determination areas $\alpha l$, $\alpha r$, the rear portion determination area $\alpha b$, and the common areas ax at a timing when receiving the response radio signal Sas from the portable device 26. The collation ECU 22 outputs a position determination signal Spo indicating whether the authorized passenger P is positioned at each of the lateral portion determination areas $\alpha l$, $\alpha r$, the rear portion determination area $\alpha b$, and the common areas ax to the door ECU 12. The door ECU 12 determines that the authorized passenger P is positioned within the common area ax in a case where the authorized passenger P is positioned at, for example, one of the lateral portion determination areas $\alpha l$, $\alpha r$ and the rear portion determination area $\alpha b$ based on the position determination signal Spo. That is, in the embodiment, the door ECU 12 corresponds to the passenger determination portion 12a.

Next, the detection of the operation input by the authorized passenger P will hereunder be explained. As illustrated in FIGS. 1 and 3, each of rear portion pillars 31 that are provided at right and left of the lateral portions of the vehicle body 2 includes a lamp 32. The lamp 32 is connected to the door ECU 12 that controls the operation thereof. The lamp 32 may correspond to lamps of, for example, a combination lamp in which, for example, a brake lamp and a winker lamp are integrally assembled, or of a single brake lamp. An upper sensor 33 (i.e., serving as a sensor) and a lower sensor 34 (i.e., serving as a sensor) are provided within the lamp 32 as sensors for detecting the operation input by the passenger P. The upper sensor 33 and the lower sensor 34 in the embodiment correspond to capacitance sensors, respectively.

Figure 4:
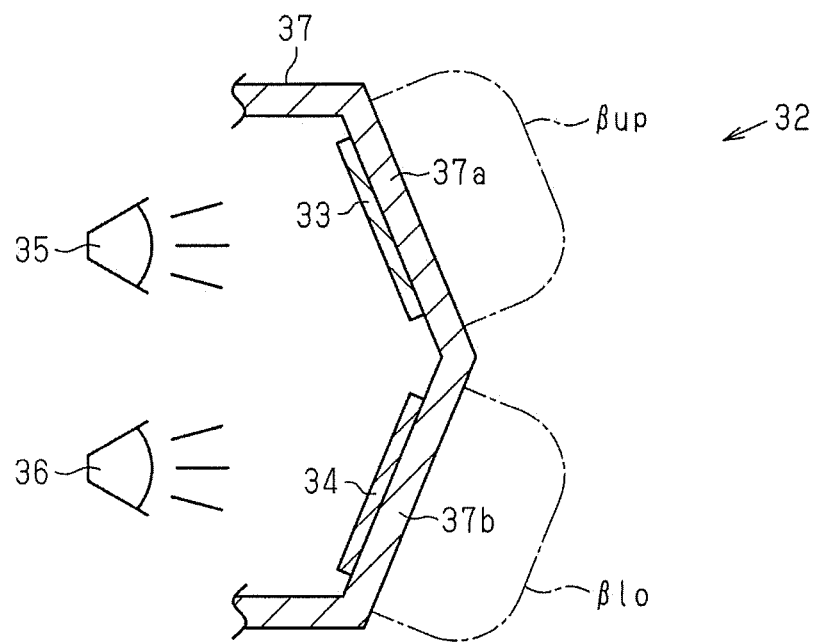
FIG. 4 is a view schematically illustrating a cross sectional structure of a lamp.

As illustrated in FIG. 4, the lamp 32 includes an upper light source 35, a lower light source 36 serving as, for example, a light emitting diode, or a LED, and a cover 37 covering the upper light source 35 and the lower light source 36. The cover 37 includes a protruding portion protruding to be formed in a substantially triangular shape to each of the lateral portions of the vehicle 1. The upper sensor 33 is disposed at an upper portion 37a of the protruding portion of the cover 37, and the lower sensor 34 is disposed at a lower portion 37b of the protruding portion of the cover 37. Accordingly, the upper light source 35 illuminates an upper detection area $\beta$up (i.e., serving as a detection area) of the upper sensor 33, that is, an area where a value of an upper detection signal Sup outputted from the upper sensor 33 changes when, for example, a hand of the passenger approaches. The lower light source 36 illuminates a lower detection area $\beta$lo (i.e., serving as a detection area) of the lower sensor 34. The door ECU 12 controls the lamp 32 to be turned on for a predetermined time by driving the lower right source 36 when the authorized passenger P is positioned within the common area $\alpha$x. When detecting that the authorized passenger P inputs the operation, the door ECU 12 drives at least one of the upper light source 35 and the lower light source 36 to flash the lamp 32 for a predetermined number of times. That is, in the embodiment, the door ECU 12 corresponds to an indicating portion 12b.

As illustrated in FIG. 1, the upper sensor 33 and the lower sensor 34 are connected to the door ECU 12 that detects the operation input in a contactless manner based on the upper detection signal Sup and the lower detection signal Slo serving as detection signals. The door ECU 12 determines that, for example, the hand of the passenger approaches when the values of the upper detection signal Sup and the lower detection signal Slo come to be equal to or greater than preset threshold values, and that, for example, the hand of the passenger separates from the upper and lower sensors 33, 34 when the values of the upper detection signal Sup and the lower detection signal Slo come to be lower than the preset threshold value. The door ECU 12 detects that the operation is inputted to the upper sensor 33 and the lower sensor 34 based on the upper detection signal Sup and the lower detection signal Slo that are inputted to the door ECU 12, and controls the operation of the backdoor 8. The door ECU 12 allows a specific operation based on the operation input of an opening operation (which corresponds to the specific operation) of the backdoor 8 which is in the fully-closed position, and of a closing operation (which corresponds to the specific operation) of the backdoor which is in the fully-open position when determining that the authorized passenger P is positioned within the common area αx. That is, the door ECU 12 corresponds to an operation input detection portion 12c, an operation control portion 12d, and an allowance determination portion 12e.

Specifically, the door ECU 12 of the embodiment opens the backdoor 8 to the fully-open position by driving a door actuator 11 in a case of determining that the backdoor 8 is in the fully-closed position and, for example, the hand of the passenger once approaches the lower sensor 34 and then separates therefrom in a state of determining that the authorized passenger P is positioned within the common area αx. Meanwhile, the door ECU 12 closes the backdoor 8 to the fully-closed position by driving the door actuator 11 in a case of determining that the backdoor 8 is in the fully-open position and, for example, the hand of the passenger once approaches the lower sensor 34 and then separates therefrom in a state of determining that the authorized passenger P is positioned within the common area αx. The door ECU 12 stops the operation of the backdoor 8 during the course of operation irrespective of whether the authorized passenger P is positioned within the common area αx in a case where, for example, the hand of the authorized passenger P approaches at least one of the upper sensor 33 and the lower sensor 34 when the backdoor 8 is opening or closing. In a case of determining that, for example, the hand of the authorized passenger P approaches the upper sensor 33 in a state where the backdoor 8 is in a stopped state during the course of opening and closing operation, the door ECU 12 opens the backdoor 8, and in a case of determining that, for example, the hand of the authorized passenger P approaches the lower sensor 34 in a state where the backdoor 8 is in the stopped state during the course of opening and closing operation, the door ECU 12 closes the backdoor 8.

Figure 5:
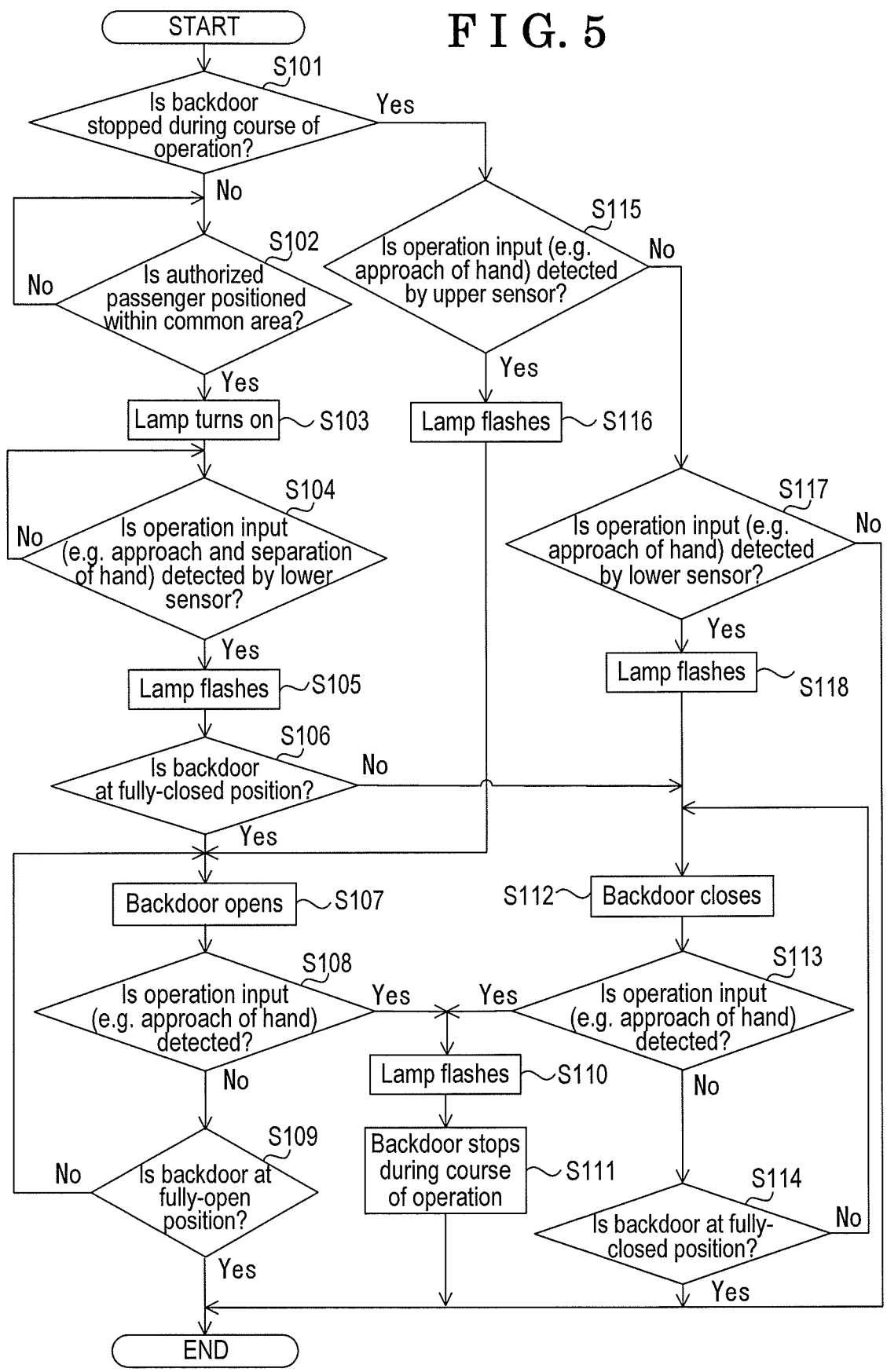
FIG. 5 is a flowchart illustrating a processing procedure of the operation control of a backdoor in response to the detection of an operation input

Next, an operation procedure of the operation control of the backdoor 8 by the door ECU 12 based on the contactless operation input will hereunder be explained. As shown in FIG. 5, the door ECU 12 determines whether the backdoor 8 stops operation at a position other than the fully-closed position or the fully-open position (Step S101), and in a case where the backdoor 8 does not stop at the position other than the fully-closed position or the fully-open position (Step S101: NO), the door ECU 12 determines whether the authorized passenger P is positioned within the common area αx (Step S102). When the authorized passenger P is positioned within the common area αx (Step S102: YES), the door ECU 12 turns on the lamp 32 to indicate that the authorized passenger P is positioned within the common area αx (Step S103). When the authorized passenger P is not positioned within the common area αx (Step S102: NO), the door ECU 12 repeatedly determines whether the authorized passenger P is positioned within the common area αx.

Subsequently, the door ECU 12 determines whether the operation input (for example, the hand of the authorized passenger P once approaches the lower sensor 34 and separates therefrom) is performed after turning on the lamp 32 (Step S104), and when detecting the operation input (for example, the hand of the authorized passenger P approaches the lower sensor 34 and separates therefrom) to the lower sensor 34 (Step S104: YES), the door ECU 12 flashes the lamp 32 to indicate the authorized passenger P that the operation input is performed (Step S105). In a case where the operation input is not detected (Step S104: NO), the door ECU 12 repeatedly determines whether the operation input is performed.

The door ECU 12 then determines whether the backdoor 8 is in the fully-closed position after flashing the lamp 32 (Step S106). In a case where the backdoor 8 is in the fully-closed position (Step S106: YES), the door ECU 12 drives the door actuator 11 to open the backdoor 8 (Step S107) and determines whether the operation input (for example, the hand of the authorized passenger P approaches the upper sensor 33 or the lower sensor 34) is performed during the opening operation of the backdoor 8 (Step S108). In a case where the operation input to the upper sensor 33 or the lower sensor 34 is not detected (Step S108: NO), the door ECU 12 determines whether the backdoor 8 opens to the fully-open position (Step S109). Then, in a case where the backdoor 8 is not in the fully-open position (Step S109: NO), the door ECU 12 moves the operation to Step S107 and continues opening the backdoor 8. Then, in a case where the backdoor 8 opens to the fully-open position (Step S109: YES), the door ECU 12 stops operation. On the other hand, in a case of detecting the operation input to the upper sensor 33 or the lower sensor 34 (Step S108: YES), the door ECU 12 flashes the lamp 32 to indicate the authorized passenger P that the operation input is performed (Step S110), stops the operation of the backdoor 8 during the course of operation (Step S111), and stops operation.

Meanwhile, in a case where the backdoor 8 is not in the fully-closed position, that is, is in the fully-open position (Step S106: NO), the door ECU 12 drives the door actuator 11 to close the backdoor 8 (Step S112), and determines whether the operation input (for example, the hand of the authorized passenger P approaches the upper sensor 33 or the lower sensor 34) is operated during the closing operation of the backdoor 8 (Step S113). In a case where the operation input to the upper sensor 33 or the lower sensor 34 is not detected (Step S113: NO), the door ECU 12 determines whether the backdoor 8 closes to the fully-closed position (Step S114). Then, in a case where the backdoor 8 is not in the fully-closed position (Step S114; NO), the door ECU 12 moves the operation to Step S112 and continues closing the back door 8. In a case where the backdoor 8 closes to the fully-closed position (Step S114: YES), the door ECU 12 stops operation. On the other hand, in a case of detecting the operation input to the upper sensor 33 or the lower sensor 34 (Step S113: YES), the door ECU 12, the same as the opening operation, moves the operation to the Steps S110, S111, flashes the lamp 32, and stops the operation of the backdoor 8 during the course of operation.

In a case where the backdoor 8 stops during the course of operation (Step S101: YES), the door ECU 12 determines whether the operation input to the upper sensor 33 (for example, the hand of the authorized passenger P approaches the upper sensor 33) is performed (Step S115). In a case of detecting the operation input to the upper sensor 33 (Step S115: YES), the door ECU 12 flashes the lamp 32 to indicate the authorized passenger P that the operation input is performed (Step S116), and opens the backdoor 8 in Steps S107 to S111. On the other hand, in a case of not detecting the operation input to the upper sensor 33 (Step S115: NO), the door ECU 12 determines whether the operation input to the lower sensor 34 is performed (for example, the hand of the authorized passenger P approaches the lower sensor 34) (Step S117). In a case of detecting the operation input to the lower sensor 34 (Step S117: YES), the door ECU 12 flashes the lamp 32 to indicate the authorized passenger P that the operation input is performed (Step S118), and closes the backdoor 8 in Steps S110 to S114. In a case of not detecting the operation input to the lower sensor 34 (Step S117: NO), the door ECU 12 does not control the backdoor 8 to open or close, and stops operation.

As described above, according to the embodiment, following advantages and effects may be attained. The door ECU 12 detects the operation input by the authorized passenger P in response to the upper detection signal Sup and the lower detection signal Slo from the upper sensor 33 and the lower sensor 34, respectively, and determines whether the authorized passenger P is positioned within the common area αx based on the position determination signal Spo from the collation ECU 22. In a case of determining that the authorized passenger P is positioned within the common area αx, the door ECU 12 allows the backdoor 8 which is in the fully-closed position or fully-open position to open and close, and controls the operation of the backdoor 8 in response to the detected operation input. Here, because the common area αx corresponds to the overlapped area of one of the lateral portion determination areas αl, αr and the rear portion determination area αb, the common area αx is set at the obliquely rear of the vehicle 1. Accordingly, when the authorized passenger P is positioned within the common area αx while the backdoor 8 operates, the movement trace in accordance with the opening and closing of the backdoor 8 and the authorized passenger P do not easily intervene with each other. Accordingly, in a case where the door ECU 12 determines that the authorized passenger P is within the common area αx, the door ECU 12 may enhance the operability of the backdoor 8 by allowing the backdoor 8 to operate in response to the detection of the operation input.

Because the door ECU 12 indicates that the authorized passenger P is positioned within the common area αx in a case of determining that the authorized passenger P is positioned within the common area αx, the operability of the backdoor 8 may be enhanced by inhibiting the authorized passenger P from being confused whether the authorized passenger P is positioned within the common area αx, that is, whether the backdoor 8 may open and close by the operation input.

Because the door ECU 12 turns on the lamp 32 to indicate that the authorized passenger P is positioned within the common area αx, components for indicating does not have to be additionally provided and the number of components may be inhibited from being increased.

Because the lamp 32 illuminates the lower detection area 1310 of the lower sensor 34 in a case where the door ECU 12 determines that the authorized passenger P is positioned within the common area αx, the authorized passenger P may easily recognize the lower detection area βlo and the operability may be further enhanced.

Because the upper sensor 33 and the lower sensor 34 is provided at the lamps 32 that are provided at the right and left of the lateral rear portions of the vehicle 1, respectively, the door ECU 12 may open and close the backdoor 8 by the operation input even in a case where the authorized passenger P is positioned at either the right or the left of the lateral rear portions of the vehicle 1, and the operability is further enhanced.

Because the upper sensor 33 and the lower sensor 34 are provided at lamps 32 each serving as a fixed part of the vehicle body 2, the operability may be enhanced because the positions of the upper sensor 33 and the lower sensor 34 do not change by the opening and closing position of the backdoor 8 comparing to a case where sensors are mounted on movable parts of, for example, the backdoor 8.

The lamp 32 includes the protruding portion protruding to the lateral portion of the vehicle 1, and the lower sensor 34 corresponding to the capacitance sensor is provided at the lower portion 37b of the cover 37 being formed in a protruding shape. Here, the detection signal from the capacitance sensor may change by a fact that the vehicle 1 is wet by, for example, rain, other than a case where, for example, the hand of the authorized passenger P approaches. According to the embodiment, because the lamp 32 includes the protruding portion, the lower portion 37b does not easily get wet by, for example, rain. Accordingly, because the operation input may be precisely determined based on the lower detection signal Slo of the lower sensor 34 provided at the lower portion 37b that is arranged below the protruding portion, the misdetection of the operation input may be inhibited.

The aforementioned embodiment may be modified as follows.

The backdoor 8 may be locked by the door lock device 16 in a case where the operation input of the lower sensor 34 is detected again in a state where the backdoor 8 is fully closed after opening. Here, all the doors (side doors 3 to 6) may be locked in addition to the backdoor 8.

The door ECU 12 may detect the operation input based on the upper detection signal Sup and the lower detection signal Slo, for example, the door ECU 12 may determine that the operation input (for example, the hand of the authorized passenger P approaches) is performed in a case where the value of the lower detection signal Slo outputted from the lower sensor 34 is greater than the value of the upper detection single Sup outputted from the upper sensor 33 by equal to or greater than a preset predetermined value. Accordingly, the door ECU 12 may inhibit the misdetermination that the operation input is performed in a case where the upper detection signal Sup and the lower detection signal Slo both increase by the fact that the vehicle 1 gets wet by heavy rain or carwash. Because the door ECU 12 determines that the operation input is performed when the value of the lower detection signal Slo is greater than the value of the upper detection signal Sup by the authorized passenger P who approaches, for example, his/her hand to the lower sensor 34, the misdetection of the operation input may be inhibited.

In the aforementioned embodiment, the door ECU 12 determines whether the portable device 26 is positioned at any of the lateral portion determination areas αl, αr, the rear portion determination area αb, and the common areas αx by the communication devices 23 to 25 that send the required radio signal Srq in the preset order, which is not limited thereto. For example, the required radio signal Srq sent by each of the communication devices 23 to 25 may include different data, and the response radio signal Sas sent by the portable device 26 as a response signal may include data corresponding to the required radio signal Srq, for the door ECU 12 to determine whether the portable device 26 is positioned within any of the lateral portion determination areas αl, αr, the rear portion determination area αb, and the common areas αx. The determination means may be appropriately changed.

In the aforementioned embodiment, the operation input to the upper sensor 33 and the lower sensor 34 for operating the backdoor 8 may be appropriately changed. For example, the backdoor 8 which is in the fully-closed position or in the fully-open position may open or close by the authorized passenger P who only approaches his/her hand to the lower sensor 34. For example, the backdoor 8 may open in a case where the operation input in which the authorized passenger P, for example, waves his/her hand from a lower position to an upper position is performed in a state where the backdoor 8 stops during the course of operation, and may close in a case where the operation input in which the authorized passenger P, for example, waves his/her hand from the upper position to the lower position is performed in a state where the backdoor 8 stops during the course of operation.

According to the aforementioned embodiment, the door ECU 12 allow the operation in a case of detecting the operation input in a state where the backdoor 8 opens, closes, or stops during the course of operation despite of whether the authorized passenger P is positioned within the common area αx. Alternatively, the door ECU 12 may allow the operation of the backdoor 8 as long as the authorized passenger P is within the common area αx even in a state where the backdoor 8 opens, closes, or stops during the course of operation. That is, the stop operation of the backdoor 8 during the opening or closing operation, or the opening and closing operations of the backdoor 8 that stops during the course of operation may be a predetermined operation that is allowed in a case where the authorized passenger P is positioned within the common area αx. Operations corresponding to the predetermined operations of the backdoor 8 may be appropriately changed.

In the aforementioned embodiment, the upper sensor 33 and the lower sensor 34 are provided at the lamp 32. Alternatively, the upper sensor 33 and the lower sensor 34 may be provided at, for example, the rear portion pillar 31, or other fixed portion of, for example, a window glass disposed next to the rear portion pillar 31 of the vehicle body 2. Alternatively, a sensor may be provided at a fixed portion of, for example, a bumper, disposed at the rear of the vehicle, and the door ECU 12 may detect a movement of the authorized passenger P who enters his/her foot into a lower position of the bumper as the operation input. That is, the mounting position of the sensor may be appropriately changed as long as the door ECU 12 may detect the operation input of the authorized passenger P who is positioned within the common area αx.

In the aforementioned embodiment, the lamp 32 is provided with the upper sensor 33 and the lower sensor 34. Alternatively, only one of the lower sensor 34 and the upper sensor 33 may be provided.

In the aforementioned embodiment, the lamp 32 includes the protruding portion protruding in a triangle manner. Alternatively, the protruding portion may be formed in an arc shape, and the shape thereof may be appropriately changed. The lamp 32 may be formed in a flat shape which does not protrude to the right side or the left side of the vehicle 1.

In the aforementioned embodiment, the lamp 32 includes the protruding portion protruding to the right side or the left side of the vehicle 1. Alternatively, the protruding portion may protrude to the rear portion or the obliquely rear portion of the vehicle 1.

In the aforementioned embodiment, the capacitance sensor may be used for the upper sensor 33 and the lower sensor 34. Alternatively, other sensors, for example, an infrared sensor which may detect the operation input in the contactless manner may be applied. Alternatively, other sensors, for example, a touch sensor which detects the operation input in response to the contact with the sensor may be applied.

In the aforementioned embodiment, the upper sensor 33 and the lower sensor 34 may be provided at only one of the lamp 32 provided at the right and the lamp 32 provided at the left.

In the aforementioned embodiment, in a case where the authorized passenger P is positioned within the common area αx, the lamp 32 illuminates the lower detection area βlo of the lower sensor 34. Alternatively, the lamp 32 may illuminate, for example, both of the upper and lower detection areas βup, βlo, or other lamp that is positioned away from the upper sensor 33 and the lower sensor 34 may be turned on. The lamp 32 may flash to indicate that the authorized passenger P is positioned in the common area αx. Alternatively, for example, sound may be generated by a speaker to indicate that authorized passenger P is positioned in the common area αx. The door ECU 12 may be configured not to indicate in a case where the authorized passenger P is positioned within the common area αx. These changes are applicable to a case where the door ECU 12 indicates that the operation input is detected.

In the aforementioned embodiment, the vehicle body 2 includes the communication devices 23 to 25. Alternatively, the disposition of the communication devices 23 to 25 may be appropriately changed as long as the common area αx may be set in the vicinity of the obliquely rear portion of the vehicle 1. The vehicle body 2 may be provided with the communication devices 23, 24 at, for example, the side doors 5, 6, the communication devices 23, 24 sending the required radio signal Srq to, for example, the lateral portion determination areas αl, αr. The communication device 25 sending the required radio single Srq to the rear portion determination area αb may be provided at the backdoor 8.

In the aforementioned embodiment, the lateral determination areas αl, αr are provided at the right and left of the lateral rear portions of the vehicle 1. Alternatively, only one of the lateral portion determination areas αl, αr may be set.

In the embodiment, the flap door is provided as the backdoor 8. Alternatively, other types of doors, for example, a swing door, may be applied. The types of the side doors 3 to 6 may be appropriately changed.

Next the technical idea obtained by the aforementioned embodiment and other examples will be described below.

A backdoor opening and closing apparatus includes the plural communication devices sending the request radio signals from the collation control device to the mobile device carried by the authorized passenger, one of the plural communication devices is disposed at the lateral rear portion of the vehicle to send the request radio signals to the lateral portion determination area, and the other of the plural communication devices is disposed at the rear portion of the vehicle to send the request radio signals to the rear portion determination area, the collation control device outputs position determination signals indicating whether the authorized passenger is positioned within the lateral portion determination area and the rear portion determination area to the passenger determination portion based on response radio signals outputted from the portable device by the response to the request radio signals, and the passenger determination portion determines whether the authorized passenger is positioned within the common area based on the position determination signal.

According to the aforementioned embodiment, the backdoor opening and closing apparatus (14) includes the operation input detection portion (12c) detecting the operation input for operating the backdoor (8) in response to the detection signal (the lower detection signal Slo, the upper detection signal Sup) sent from the plural sensors (the upper sensor 33, the lower sensor 34) each configured to include the detection area (the upper detection area βup, the lower detection area (βlo) at the lateral rear portion of the vehicle (1), the operation control portion (12d) operating the backdoor (8) in response to the operation input, the passenger determination portion (12a) determining whether the authorized passenger (P) who has the operation authority is positioned within the common area (αx) where the lateral portion determination area (αl) and the rear portion determination area (αr) overlap with each other, the lateral portion determination area (αl) which is set in the vicinity of the lateral rear portion of the vehicle, the rear portion determination area (αr) which is set in the vicinity of a rear of the vehicle (1), and the allowance determination portion (12e) allowing the predetermined operation of the backdoor (8) in response to the operation input in a case where the passenger determination portion (12a) determines that the authorized passenger (P) is positioned within the common area (αx).

According to the aforementioned configuration, the common area (αx) corresponds to the area where the lateral portion determination area (αl) and the rear portion determination area (αr) are overlapped with each other, and is set at the oblique rear of the vehicle (1). Accordingly, in a case where the authorized passenger (P) is positioned at the common area (αx) when the backdoor (8) is operated, the operation trace of the opening and closing of the backdoor (8) and the authorized passenger (P) do not interfere with each other. Thus, in a case where the authorized passenger (P) is determined to be positioned within the common area (αx), the operability is enhanced by allowing the predetermined operation of the backdoor (8) in response to the detection of the operation input.

According to the aforementioned embodiment, the backdoor opening and closing apparatus (14) further includes the indicating portion (12b) indicating that the authorized passenger (P) is positioned within the common area (αx) in a case where the passenger determination portion (12a) determines that the authorized passenger (P) is positioned within the common area (αx).

According to the aforementioned configuration, because the indicating portion (12b) indicates that the authorized passenger (P) is positioned within the common area (αx), the authorized passenger (P) is inhibited from being confused whether the authorized passenger (P) is positioned within the common area (αx), that is, whether the backdoor (8) may operate by the operation input.

According to the aforementioned embodiment, the indicating portion (12b) operates the lamp (32) provided at the lateral rear portion of the vehicle (1).

According to the aforementioned configuration, because the indicating portion (12b) may turn on or flash, for example, the lamp to indicate that the authorized passenger (P) is positioned within the common area (αx), a component for indicating does not have to be additionally provided, and the number of components is prevented from increasing.

According to the aforementioned embodiment, the lamp (32) illuminates the detection area (the lower detection area βlo, the upper detection area βup).

According to the aforementioned configuration, the authorized passenger (P) may easily recognize the detection area (the upper detection area βup, the lower detection area βlo) of the sensor (the upper sensor 33, the lower sensor 34), and the operability may be further enhanced.

According to the aforementioned embodiment, the sensor (the upper sensor 33, the lower sensor 34) is provided at each of right and left lateral rear portions of the vehicle (1).

According to the aforementioned configuration, because the backdoor (8) may operate by the operation input even in a case where the authorized passenger (P) is positioned at the right and left of the lateral rear portions of the vehicle, the operability may be further enhanced.

According to the aforementioned embodiment, the sensor (the upper sensor 33, the lower sensor 34) is provided at a fixed part of a vehicle body (2), the fixed part on which the backdoor (8) of the vehicle (1) is mounted in an openable and closable manner.

According to the aforementioned configuration, unlike a case where the sensor (the upper sensor 33, the lower sensor 34) is provided at the movable part, for example, the backdoor (8), the position of the sensor (the upper sensor 33, the lower sensor 34) does not move in accordance with the opening and closing position of the backdoor (8), and the operability may be enhanced.

According to the aforementioned embodiment, the lamp (32) provided at the lateral rear portion of the vehicle (1) includes the protruding portion protruding from the vehicle (1), and the sensor (34) includes the capacitance sensor provided at the lower portion (37b) of the protruding portion.

The detection signals (the lower detection signal Slo, the upper detection signal Sup) from the static sensor may change by the fact that the vehicle (1) gets wet by, for example, rain, other than a case where, for example, the hand of the authorized passenger (P) approaches. According to the aforementioned configuration, because the lamp includes the protruding portion, the lower portion (37b) of the protruding portion does not easily get wet. Accordingly, because the operation input may be further precisely determined in response to the detection signals (the lower detection signal Slo) from the static sensor provided at the lower portion (37b) of the protruding portion, the misdetection of the operation input may be inhibited.

According to the aforementioned embodiment, the sensor (33) includes the capacitance sensor provided at the upper portion (37a) of the protruding portion.

According to the aforementioned configuration, because the operation input is determined in response to the detection signal (the lower detection signal Slo, the upper detection signal Sup) from the capacitance sensor provided at the upper portion (37a) and the lower portion (37b), the misdetermination that the operation is inputted may be prevented in a case where the value of the detection signal (the lower detection signal Slo, the upper detection signal Sup) increases due to that the vehicle gets wet by, for example, heavy rain or carwash. In addition, because the value of the detection signals (the lower detection signal Slo) of the capacitance sensor provided at the lower portion (37b) increases greater than the value of the detection signal (the upper detection signal Sup) from the capacitance sensor provided at the upper portion (37a) by equal to or greater than the predetermined value when the passenger (P) approaches, for example, his/her hand to the capacitance sensor provided at, for example, the lower portion (37b), the operation may be determined to be inputted, and accordingly, the operation input may be prevented from being misdetected.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A backdoor opening and closing apparatus, comprising:
a lateral communication device arranged at a left lateral rear portion, a right lateral rear portion, or at both the left and right lateral rear portions of a vehicle, the lateral communication device having a lateral portion determination reception area wherein radio signals sent by the lateral communication device reach;
a rear communication device arranged at a rear end portion of the vehicle, the rear communication device having a rear portion determination reception area wherein radio signals sent by the rear communication device reach;
a portable device which sends a response radio signal in response to the radio signals sent by the lateral communication device and the rear communication device;
a sensor having a detection area and provided at the lateral rear portion of the vehicle; and
processing circuitry configured to
receive the response radio signal sent by the portable device,
determine whether an authorized passenger who carries the portable device is positioned within any of the lateral portion determination or rear portion determination areas,
determine whether the authorized passenger is positioned within a common area by determining when the authorized passenger is positioned within an area wherein the lateral portion determination area and the rear portion determination area overlap,
initiate a predetermined operation of the backdoor in response to the detection signal sent by the sensor only when it is determined that the authorized passenger is positioned within the common area, and
operate a backdoor in response to a detection signal sent by the sensor.

2. The backdoor opening and closing apparatus according to claim 1, wherein the processing circuitry operates a lamp provided at the lateral rear portion of the vehicle.

3. The backdoor opening and closing apparatus according to claim 2, wherein the lamp illuminates the detection area.

4. The backdoor opening and closing apparatus according to claim 1, wherein the sensor is provided at each of the right lateral rear portion and the left lateral rear portion of the vehicle.

5. The backdoor opening and closing apparatus according to claim 1, wherein the sensor is provided at a fixed part of a vehicle body, the fixed part on which the backdoor of the vehicle is mounted in an openable and closable manner.

6. The backdoor opening and closing apparatus according to claim 2, wherein
the lamp provided at the lateral rear portion of the vehicle includes a protruding portion protruding from the vehicle, and
the sensor includes a capacitance sensor provided at a lower portion of the protruding portion.

7. The backdoor opening and closing apparatus according to claim 6, wherein the sensor includes the capacitance sensor provided at an upper portion of the protruding portion.

* * * * *